United States Patent
Hurry et al.

(10) Patent No.: US 9,065,643 B2
(45) Date of Patent: Jun. 23, 2015

(54) SYSTEM AND METHOD FOR ACCOUNT IDENTIFIER OBFUSCATION

(75) Inventors: Simon Hurry, Foster City, CA (US); Christian Aabye, Morgan Hill, CA (US)

(73) Assignee: Visa U.S.A. Inc., San Francisco, CA (US)

(*) Notice: Subject to any disclaimer, the term of this patent is extended or adjusted under 35 U.S.C. 154(b) by 402 days.

(21) Appl. No.: 12/146,150

(22) Filed: Jun. 25, 2008

(65) Prior Publication Data

US 2009/0030845 A1    Jan. 29, 2009

Related U.S. Application Data

(60) Provisional application No. 60/946,224, filed on Jun. 26, 2007.

(51) Int. Cl.
*G06Q 20/00* (2012.01)
*H04L 9/12* (2006.01)
*G06Q 20/38* (2012.01)
*H04L 9/32* (2006.01)

(52) U.S. Cl.
CPC ............ *H04L 9/12* (2013.01); *G06Q 20/3829* (2013.01); *H04L 2209/04* (2013.01); *H04L 9/3234* (2013.01); *H04L 2209/56* (2013.01); *H04L 2209/80* (2013.01)

(58) Field of Classification Search
USPC ............ 705/76, 16, 21, 59; 380/44, 262, 278, 380/279
See application file for complete search history.

(56) References Cited

U.S. PATENT DOCUMENTS

| 3,956,615 A | 5/1976 | Anderson et al. |
| 4,186,871 A | 2/1980 | Anderson et al. |
| 4,238,853 A | 12/1980 | Ehrsam et al. |
| 4,277,837 A | 7/1981 | Stuckert |
| 4,317,957 A | 3/1982 | Sendrow |
| 4,423,287 A | 12/1983 | Zeidler |
| 4,528,442 A | 7/1985 | Endo |
| 4,614,861 A | 9/1986 | Pavlov et al. |
| 4,707,592 A | 11/1987 | Ware |
| 4,742,351 A | 5/1988 | Suzuki |
| 4,852,165 A | 7/1989 | Copella et al. |
| 5,254,843 A | 10/1993 | Hynes et al. |

(Continued)

FOREIGN PATENT DOCUMENTS

| JP | 2000078128 A | 3/2000 |
| JP | 2000322486 A | 11/2000 |

(Continued)

OTHER PUBLICATIONS

Fujitsu Microelectronics America Announces New Fingerprint Identification Technology for Cell Phones, Mobile Devices, Mar. 11, 2002 by Fujitsu Microelectronics America, Inc. at www.fujitsu.com/us/news/pr/fma.sub.--20020311.html.

(Continued)

*Primary Examiner* — Dante Ravetti
(74) *Attorney, Agent, or Firm* — Kilpatrick Townsend & Stockton LLP

(57) ABSTRACT

A method is disclosed. The method includes generating an obfuscated portion using a dynamic cryptogram unique to a transaction, where the dynamic cryptogram is determined using a uniquely derived key. The method also includes replacing a middle portion of the account identifier with the obfuscated portion to form an obfuscated account identifier.

21 Claims, 10 Drawing Sheets

(56) References Cited

U.S. PATENT DOCUMENTS

| | | |
|---|---|---|
| 5,311,594 A | 5/1994 | Penzias |
| 5,361,062 A | 11/1994 | Weiss et al. |
| 5,420,926 A | 5/1995 | Low et al. |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,539,810 A | 7/1996 | Kennedy et al. |
| 5,613,012 A | 3/1997 | Hoffman et al. |
| 5,615,110 A | 3/1997 | Wong |
| 5,625,689 A | 4/1997 | Indeck et al. |
| 5,627,355 A | 5/1997 | Rahman et al. |
| 5,679,940 A | 10/1997 | Templeton et al. |
| 5,708,422 A | 1/1998 | Blonder et al. |
| 5,715,399 A | 2/1998 | Bezos et al. |
| 5,721,781 A | 2/1998 | Deo et al. |
| 5,740,244 A | 4/1998 | Indeck et al. |
| 5,745,576 A | 4/1998 | Abraham et al. |
| 5,774,525 A | 6/1998 | Kanevsky et al. |
| 5,819,226 A | 10/1998 | Gopinathan et al. |
| 5,832,458 A | 11/1998 | Jones |
| 5,834,747 A | 11/1998 | Cooper |
| 5,835,599 A | 11/1998 | Buer |
| 5,839,119 A | 11/1998 | Krsul et al. |
| 5,872,834 A | 2/1999 | Teitelbaum |
| 5,878,337 A | 3/1999 | Joao et al. |
| 5,883,810 A | 3/1999 | Franklin |
| 5,903,830 A | 5/1999 | Joao et al. |
| 5,914,471 A | 6/1999 | Van De Pavert |
| 5,914,472 A | 6/1999 | Foladare et al. |
| 5,920,628 A | 7/1999 | Indeck et al. |
| 5,956,699 A | 9/1999 | Wong et al. |
| 5,988,497 A | 11/1999 | Wallace |
| 6,000,832 A | 12/1999 | Franklin et al. |
| 6,005,942 A | 12/1999 | Chan et al. |
| 6,012,144 A | 1/2000 | Pickett |
| 6,016,476 A | 1/2000 | Maes et al. |
| 6,029,154 A | 2/2000 | Pettitt |
| 6,055,505 A | 4/2000 | Elston |
| 6,064,990 A | 5/2000 | Goldsmith |
| 6,065,679 A * | 5/2000 | Levie et al. ............... 235/462.47 |
| 6,081,792 A | 6/2000 | Cucinotta et al. |
| 6,095,413 A | 8/2000 | Tetro et al. |
| 6,112,191 A | 8/2000 | Burke |
| 6,122,624 A | 9/2000 | Tetro et al. |
| 6,157,707 A | 12/2000 | Baulier et al. |
| 6,163,771 A | 12/2000 | Walker et al. |
| 6,219,793 B1 | 4/2001 | Li et al. |
| 6,236,981 B1 | 5/2001 | Hill |
| 6,260,146 B1 | 7/2001 | Mos et al. |
| 6,263,447 B1 | 7/2001 | French et al. |
| 6,282,656 B1 | 8/2001 | Wang |
| 6,298,336 B1 | 10/2001 | Davis et al. |
| 6,308,890 B1 | 10/2001 | Cooper |
| 6,327,578 B1 | 12/2001 | Linehan |
| 6,330,550 B1 | 12/2001 | Brisebois et al. |
| 6,367,011 B1 | 4/2002 | Lee et al. |
| 6,415,386 B1 * | 7/2002 | Shi et al. .................... 726/34 |
| 6,442,532 B1 | 8/2002 | Kawan |
| 6,488,206 B1 | 12/2002 | Flaig et al. |
| 6,496,936 B1 | 12/2002 | French et al. |
| 6,505,046 B1 | 1/2003 | Baker |
| 6,523,745 B1 | 2/2003 | Tamori |
| 6,529,725 B1 | 3/2003 | Joao et al. |
| 6,535,855 B1 | 3/2003 | Cahill et al. |
| 6,592,044 B1 | 7/2003 | Wong et al. |
| 6,607,136 B1 | 8/2003 | Atsmon et al. |
| 6,612,488 B2 | 9/2003 | Suzuki |
| 6,631,482 B1 * | 10/2003 | Marks ............... 714/45 |
| 6,636,833 B1 | 10/2003 | Flitcroft et al. |
| 6,647,269 B2 | 11/2003 | Hendrey et al. |
| 6,714,918 B2 | 3/2004 | Hillmer et al. |
| 6,715,672 B1 | 4/2004 | Tetro et al. |
| 6,748,367 B1 | 6/2004 | Lee |
| RE38,572 E | 8/2004 | Tetro et al. |
| 6,775,539 B2 | 8/2004 | Deshpande |
| 6,823,721 B1 | 11/2004 | Hilpert |
| 6,830,183 B2 | 12/2004 | von Mueller et al. |
| 6,832,721 B2 | 12/2004 | Fujii |
| 6,836,670 B2 | 12/2004 | Casstrogiovanni et al. |
| 6,837,425 B2 | 1/2005 | Gauthier et al. |
| 6,839,692 B2 | 1/2005 | Carrott et al. |
| 6,839,840 B1 | 1/2005 | Cooreman |
| 6,839,845 B2 | 1/2005 | Hsu et al. |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,879,965 B2 | 4/2005 | Fung et al. |
| 6,899,269 B1 | 5/2005 | Deland |
| 6,913,194 B2 | 7/2005 | Suzuki |
| 6,931,382 B2 | 8/2005 | Laage et al. |
| 6,941,285 B2 | 9/2005 | Sarcanin |
| 6,944,782 B2 | 9/2005 | von Mueller et al. |
| 6,948,656 B2 | 9/2005 | Williams |
| 6,968,180 B2 | 11/2005 | Kirby et al. |
| 6,983,882 B2 | 1/2006 | Cassone |
| 7,003,495 B1 | 2/2006 | Burger et al. |
| 7,003,497 B2 | 2/2006 | Maes |
| 7,007,025 B1 | 2/2006 | Nason et al. |
| 7,007,840 B2 | 3/2006 | Davis |
| 7,013,293 B1 | 3/2006 | Kipnis et al. |
| 7,024,396 B2 | 4/2006 | Woodward |
| 7,044,394 B2 | 5/2006 | Brown |
| 7,051,002 B2 | 5/2006 | Keresman et al. |
| 7,058,611 B2 | 6/2006 | Kranzley et al. |
| 7,058,978 B2 | 6/2006 | Feuerstein et al. |
| 7,080,035 B1 | 7/2006 | Williams et al. |
| 7,096,003 B2 | 8/2006 | Joao et al. |
| 7,107,250 B2 | 9/2006 | Harrison |
| 7,143,095 B2 | 11/2006 | Barrett et al. |
| 7,152,788 B2 | 12/2006 | Williams |
| 7,155,411 B1 | 12/2006 | Blinn et al. |
| 7,177,848 B2 | 2/2007 | Hogan et al. |
| 7,225,156 B2 | 5/2007 | Fisher et al. |
| 7,243,853 B1 | 7/2007 | Levy et al. |
| 7,251,624 B1 | 7/2007 | Lee et al. |
| 7,257,545 B1 | 8/2007 | Hung |
| 7,264,154 B2 | 9/2007 | Harris |
| 7,287,692 B1 | 10/2007 | Patel et al. |
| 7,292,999 B2 | 11/2007 | Hobson et al. |
| 7,343,317 B2 | 3/2008 | Jokinen et al. |
| 7,349,668 B2 | 3/2008 | Ilan et al. |
| 7,350,230 B2 | 3/2008 | Forrest |
| 7,353,382 B2 | 4/2008 | Labrou et al. |
| D568,388 S | 5/2008 | Hammad |
| D568,389 S | 5/2008 | Hammad |
| D568,390 S | 5/2008 | Law et al. |
| 7,376,629 B1 | 5/2008 | McIsaac et al. |
| 7,403,908 B1 | 7/2008 | Jaramillo |
| 7,415,109 B2 | 8/2008 | Rose et al. |
| 7,420,474 B1 | 9/2008 | Elks et al. |
| 7,444,676 B1 | 10/2008 | Asghari-Kamrani et al. |
| 7,506,812 B2 | 3/2009 | von Mueller et al. |
| 7,527,208 B2 | 5/2009 | Hammad et al. |
| 7,548,889 B2 | 6/2009 | Bhambri et al. |
| 7,571,139 B1 | 8/2009 | Giordano et al. |
| 7,580,898 B2 | 8/2009 | Brown et al. |
| 7,584,153 B2 | 9/2009 | Brown et al. |
| 7,650,314 B1 | 1/2010 | Saunders |
| 7,665,657 B2 | 2/2010 | Huh |
| 7,685,037 B2 | 3/2010 | Reiners et al. |
| 7,707,120 B2 | 4/2010 | Dominguez et al. |
| 7,712,655 B2 | 5/2010 | Wong |
| 7,731,086 B2 | 6/2010 | Saunders et al. |
| 7,734,527 B2 | 6/2010 | Uzo |
| 7,740,168 B2 | 6/2010 | Hammad |
| 7,740,173 B2 | 6/2010 | Von Mueller et al. |
| 7,761,374 B2 | 7/2010 | Sahota |
| 7,793,851 B2 | 9/2010 | Mullen |
| 7,810,165 B2 | 10/2010 | Hammad et al. |
| 7,818,264 B2 | 10/2010 | Hammad |
| 7,853,995 B2 | 12/2010 | Chow et al. |
| 7,877,299 B2 | 1/2011 | Bui |

(56) References Cited

U.S. PATENT DOCUMENTS

| | | | |
|---|---|---|---|
| 7,890,393 B2 | 2/2011 | Talbert et al. | |
| 7,891,563 B2 | 2/2011 | Oder, II et al. | |
| 7,896,238 B2 | 3/2011 | Fein et al. | |
| 7,925,908 B2 | 4/2011 | Kim | |
| 7,938,726 B2 | 5/2011 | Brunet De Courssou | |
| 7,959,076 B1 | 6/2011 | Hopkins, III | |
| 8,025,223 B2 | 9/2011 | Saunders et al. | |
| 8,060,448 B2 | 11/2011 | Jones | |
| 8,082,210 B2 | 12/2011 | Hansen et al. | |
| 8,104,679 B2 | 1/2012 | Brown | |
| 8,118,223 B2 | 2/2012 | Hammad et al. | |
| 8,135,647 B2 | 3/2012 | Hammad et al. | |
| 8,205,791 B2 | 6/2012 | Randazza et al. | |
| 8,249,993 B2 | 8/2012 | von Mueller | |
| 8,412,837 B1 | 4/2013 | Emigh et al. | |
| 8,417,642 B2 | 4/2013 | Oren | |
| 8,453,925 B2 | 6/2013 | Fisher et al. | |
| 8,584,251 B2 | 11/2013 | McGuire et al. | |
| 8,595,490 B2 | 11/2013 | von Mueller et al. | |
| 2001/0047334 A1* | 11/2001 | Nappe et al. | 705/41 |
| 2001/0056409 A1 | 12/2001 | Bellovin | |
| 2002/0007320 A1 | 1/2002 | Hogan et al. | |
| 2002/0016749 A1 | 2/2002 | Borecki et al. | |
| 2002/0026478 A1 | 2/2002 | Rodgers et al. | |
| 2002/0069240 A1* | 6/2002 | Berk | 709/203 |
| 2002/0073044 A1 | 6/2002 | Singhal | |
| 2002/0073045 A1 | 6/2002 | Rubin et al. | |
| 2002/0073315 A1* | 6/2002 | Candelore | 713/172 |
| 2002/0077144 A1 | 6/2002 | Keller et al. | |
| 2002/0091562 A1 | 7/2002 | Siegel et al. | |
| 2002/0091945 A1 | 7/2002 | Ross | |
| 2002/0095389 A1 | 7/2002 | Gaines | |
| 2002/0099665 A1 | 7/2002 | Burger et al. | |
| 2002/0107798 A1* | 8/2002 | Hameau et al. | 705/41 |
| 2002/0108062 A1 | 8/2002 | Nakajima et al. | |
| 2002/0116341 A1 | 8/2002 | Hogan et al. | |
| 2002/0133462 A1 | 9/2002 | Shteyn | |
| 2002/0153424 A1 | 10/2002 | Li | |
| 2002/0180584 A1 | 12/2002 | McGregor et al. | |
| 2002/0194499 A1 | 12/2002 | Audebert et al. | |
| 2003/0028481 A1 | 2/2003 | Flitcroft et al. | |
| 2003/0074317 A1 | 4/2003 | Hofi | |
| 2003/0080185 A1 | 5/2003 | Werther | |
| 2003/0115142 A1 | 6/2003 | Brickell et al. | |
| 2003/0126094 A1 | 7/2003 | Fisher et al. | |
| 2003/0130955 A1 | 7/2003 | Hawthorne | |
| 2003/0135463 A1 | 7/2003 | Brown et al. | |
| 2003/0140007 A1 | 7/2003 | Kramer et al. | |
| 2003/0168510 A1 | 9/2003 | Allen | |
| 2003/0169881 A1 | 9/2003 | Niedermeyer | |
| 2003/0191945 A1 | 10/2003 | Keech | |
| 2003/0200184 A1 | 10/2003 | Dominguez et al. | |
| 2003/0208684 A1 | 11/2003 | Camacho et al. | |
| 2003/0225703 A1 | 12/2003 | Angel | |
| 2004/0024638 A1 | 2/2004 | Restis | |
| 2004/0031856 A1 | 2/2004 | Atsmon et al. | |
| 2004/0059688 A1 | 3/2004 | Dominguez et al. | |
| 2004/0064403 A1 | 4/2004 | Hasumi et al. | |
| 2004/0078340 A1 | 4/2004 | Evans | |
| 2004/0107170 A1 | 6/2004 | Labrou et al. | |
| 2004/0139008 A1 | 7/2004 | Mascavage, III | |
| 2004/0156537 A1 | 8/2004 | Chung et al. | |
| 2004/0171406 A1 | 9/2004 | Purk | |
| 2004/0185830 A1 | 9/2004 | Joao et al. | |
| 2004/0199470 A1 | 10/2004 | Ferry et al. | |
| 2004/0260646 A1* | 12/2004 | Berardi et al. | 705/39 |
| 2005/0029349 A1 | 2/2005 | McGregor et al. | |
| 2005/0037735 A1 | 2/2005 | Coutts | |
| 2005/0060233 A1 | 3/2005 | Bonalle et al. | |
| 2005/0060730 A1 | 3/2005 | Soeda et al. | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0080730 A1 | 4/2005 | Sorrentino | |
| 2005/0091152 A1 | 4/2005 | Suisa | |
| 2005/0097320 A1 | 5/2005 | Golan et al. | |
| 2005/0122209 A1 | 6/2005 | Black | |
| 2005/0125686 A1* | 6/2005 | Brandt | 713/200 |
| 2005/0149455 A1 | 7/2005 | Bruesewitz et al. | |
| 2005/0170814 A1 | 8/2005 | Joao et al. | |
| 2005/0171905 A1 | 8/2005 | Wankmueller et al. | |
| 2005/0218229 A1 | 10/2005 | Morley, Jr. et al. | |
| 2005/0228986 A1 | 10/2005 | Fukasawa et al. | |
| 2005/0246293 A1 | 11/2005 | Ong | |
| 2005/0268107 A1 | 12/2005 | Harris et al. | |
| 2005/0273442 A1 | 12/2005 | Bennett et al. | |
| 2006/0018523 A1 | 1/2006 | Saitoh et al. | |
| 2006/0059110 A1 | 3/2006 | Madhok et al. | |
| 2006/0124756 A1 | 6/2006 | Brown | |
| 2006/0136546 A1 | 6/2006 | Trioano et al. | |
| 2006/0165060 A1 | 7/2006 | Dua | |
| 2006/0189367 A1* | 8/2006 | Nguyen et al. | 463/16 |
| 2006/0202025 A1 | 9/2006 | Calabrese et al. | |
| 2006/0210071 A1 | 9/2006 | Chandran et al. | |
| 2006/0219776 A1 | 10/2006 | Finn | |
| 2006/0235795 A1 | 10/2006 | Johnson et al. | |
| 2006/0237528 A1 | 10/2006 | Bishop et al. | |
| 2006/0253687 A1 | 11/2006 | Jakubowski et al. | |
| 2006/0265446 A1* | 11/2006 | Elgressy et al. | 709/200 |
| 2006/0278704 A1 | 12/2006 | Saunders et al. | |
| 2006/0281439 A1 | 12/2006 | Benco et al. | |
| 2006/0282382 A1 | 12/2006 | Balasubramanian et al. | |
| 2006/0282395 A1 | 12/2006 | Leibowitz | |
| 2006/0290501 A1 | 12/2006 | Hammad et al. | |
| 2006/0293027 A1 | 12/2006 | Hammad et al. | |
| 2007/0017970 A1 | 1/2007 | Gauthier et al. | |
| 2007/0034679 A1 | 2/2007 | Gauthier et al. | |
| 2007/0055630 A1 | 3/2007 | Gauthier et al. | |
| 2007/0057034 A1 | 3/2007 | Gauthier et al. | |
| 2007/0130062 A1 | 6/2007 | Huh | |
| 2007/0136131 A1 | 6/2007 | Mankoff | |
| 2007/0245414 A1 | 10/2007 | Chan et al. | |
| 2007/0250380 A1 | 10/2007 | Mankoff | |
| 2007/0260544 A1 | 11/2007 | Wankmueller et al. | |
| 2007/0276765 A1 | 11/2007 | Hazel et al. | |
| 2007/0288641 A1 | 12/2007 | Lee et al. | |
| 2007/0294182 A1 | 12/2007 | Hammad | |
| 2008/0004121 A1 | 1/2008 | Gatto et al. | |
| 2008/0005037 A1 | 1/2008 | Hammad et al. | |
| 2008/0029593 A1 | 2/2008 | Hamamd et al. | |
| 2008/0034221 A1 | 2/2008 | Hammad et al. | |
| 2008/0040271 A1 | 2/2008 | Hammad et al. | |
| 2008/0040276 A1 | 2/2008 | Hammad et al. | |
| 2008/0052782 A1* | 2/2008 | Hillis et al. | 726/26 |
| 2008/0065553 A1 | 3/2008 | Faith | |
| 2008/0103982 A1 | 5/2008 | Hammad et al. | |
| 2008/0116264 A1 | 5/2008 | Hammad et al. | |
| 2008/0120214 A1 | 5/2008 | Steele et al. | |
| 2008/0120236 A1 | 5/2008 | Faith et al. | |
| 2008/0163257 A1 | 7/2008 | Carlson et al. | |
| 2008/0172737 A1* | 7/2008 | Shen et al. | 726/21 |
| 2008/0183480 A1 | 7/2008 | Carlson et al. | |
| 2008/0201212 A1 | 8/2008 | Hammad et al. | |
| 2008/0203151 A1 | 8/2008 | Dixon et al. | |
| 2008/0203152 A1 | 8/2008 | Hammad et al. | |
| 2008/0203170 A1 | 8/2008 | Hammad et al. | |
| 2008/0208681 A1 | 8/2008 | Hammad et al. | |
| 2008/0243702 A1 | 10/2008 | Hart et al. | |
| 2008/0275829 A1* | 11/2008 | Stull et al. | 706/17 |
| 2008/0303632 A1 | 12/2008 | Hammad | |
| 2009/0006262 A1 | 1/2009 | Brown et al. | |
| 2009/0083191 A1 | 3/2009 | Hammad et al. | |
| 2009/0089213 A1 | 4/2009 | Hammad | |
| 2009/0106112 A1 | 4/2009 | Dalmia et al. | |
| 2009/0171682 A1 | 7/2009 | Dixon et al. | |
| 2009/0171849 A1 | 7/2009 | Hammad et al. | |
| 2009/0202081 A1 | 8/2009 | Hammad et al. | |
| 2010/0027780 A1* | 2/2010 | Jung et al. | 380/28 |
| 2011/0004553 A1 | 1/2011 | Hammad et al. | |

(56) References Cited

U.S. PATENT DOCUMENTS

2013/0262296 A1 10/2013 Thomas et al.
2013/0297508 A1 11/2013 Belamant

FOREIGN PATENT DOCUMENTS

| JP | 2002024719 A | 1/2002 |
|----|--------------|--------|
| JP | 2002366868 A | 12/2002 |
| JP | 2003519420 A | 6/2003 |
| JP | 2007517272 A | 6/2007 |
| WO | 01/35304 A1 | 5/2001 |
| WO | 2005/059795 A1 | 6/2005 |
| WO | WO2005/059795 A1 | 6/2005 |

OTHER PUBLICATIONS

International Search Report mailed on Dec. 6, 2007, for PCT Patent Application No. PCT/US07/71200, 1 page.
Written Opinion of the International Searching Authority mailed on Dec. 6, 2007, for PCT Patent Application No. PCT/US07/71200, 6 pages.
Australian Office Action mailed on Jul. 1, 2010, for AU Patent Application No. 2007261152, 2 pages.
Australian Notice of Acceptance mailed on Aug. 11, 2011 for AU Patent Application No. 2007261152, 3 pages.
Australian Examination Report mailed on Jun. 29, 2012 for AU Patent Application No. 2008268326, 3 pages.
Japanese Office Action mailed Oct. 12, 2012 in Application No. 2009-516638, issued Oct. 10, 2012.
The International Search Report of the International Searching Authority for Application No. PCT/US2008/068281, mailed Oct. 22, 2008, 1 page.
The International Written Opinion of the International Searching Authority for Application No. PCT/US2008/068281, mailed Oct. 22, 2008, 4 pages.
Menezes, A. J., et al., "Handbook of Applied Cryptography;" XP-002662759, Oct. 1997, CRC Press, LLC, USA; pp. 192-194, 330-331, 363, 490, 498-499, 551-553 (12 pages total).
The Supplementary European Search Report for Application No. EP08781002.4, dated Nov. 15, 2011, 7 pages.
U.S. Appl. No. 11/761,370, filed Jun. 14, 2007.
U.S. Appl. No. 11/763,240, filed Jun. 14, 2007.
U.S. Appl. No. 11/764,343, filed Jun. 18, 2007.
U.S. Appl. No. 11/764,351, filed Jun. 18, 2007.
U.S. Appl. No. 11/764,361, filed Jun. 18, 2007.
U.S. Appl. No. 11/764,376, filed Jun. 18, 2007.
U.S. Appl. No. 11/764,622, filed Jun. 18, 2007.
U.S. Appl. No. 10/642,878, filed Aug. 18, 2003.
U.S. Appl. No. 11/536,296, filed Sep. 26, 2006.
U.S. Appl. No. 11/566,614, filed Dec. 4, 2006.
U.S. Appl. No. 11/680,589, filed Feb. 28, 2007.
U.S. Appl. No. 11/680,592, filed Feb. 28, 2007.
U.S. Appl. No. 11/680,594, filed Feb. 28, 2007.
U.S. Appl. No. 11/764,370, filed Jun. 18, 2007.
U.S. Appl. No. 11/811,875, filed Jun. 11, 2007.
U.S. Appl. No. 11/935,740, filed Nov. 6, 2007.
U.S. Appl. No. 11/940,074, filed Nov. 14, 2007.
U.S. Appl. No. 11/962,836, filed Dec. 21, 2007.
U.S. Appl. No. 11/963,736, filed Dec. 28, 2007.
U.S. Appl. No. 11/966,233, filed Dec. 21, 2007.
U.S. Appl. No. 12/022,060, filed Jan. 28, 2008.
U.S. Appl. No. 12/022,075, filed Jan. 29, 2008.
U.S. Appl. No. 12/028,220, filed Feb. 8, 2008.
Japanese office action mailed Jun. 7, 2013 for JP Patent Application No. 2009-516638, 8 pages.
Canadian Office Action mailed Dec. 17, 2014 in CA Patent Application No. 2,691,789, 2 pages.
Non-Final Office Action mailed Jan. 15, 2015 in U.S. Appl. No. 12/263,982, 26 pages.
Canadian Office Action from Application No. 2,655,465, dated Jul. 14, 2014, 2 pages.
Restriction Requirement for U.S. Appl. No. 11/761,821 mailed Oct. 3, 2008, 6 pages.
Non-Final Office Action for U.S. Appl. No. 11/761,821 mailed on Jan. 23, 2009, 14 pages.
Final Office Action for U.S. Appl. No. 11/761,821 mailed on Jul. 8, 2009, 15 pages.
Non-Final Office Action for U.S. Appl. No. 11/761,821 mailed on Jan. 21, 2010, 23 pages.
Non-Final Office Action for U.S. Appl. No. 12/263,933 mailed on Jun. 9, 2010, 20 pages.
Non-Final Office Action for U.S. Appl. No. 12/264,036 mailed on Aug. 3, 2010, 18 pages.
Final Office Action for U.S. Appl. No. 12/263,933 mailed on Nov. 26, 2010, 21 pages.
Non-Final Office Action for U.S. Appl. No. 12/883,413 mailed on Jan. 5, 2011, 14 pages.
Final Office Action for U.S. Appl. No. 12/264,036 mailed on Feb. 1, 2011, 23 pages.
Non-Final Office Action for U.S. Appl. No. 12/263,982 mailed on Apr. 12, 2011, 13 pages.
Final Office Action for U.S. Appl. No. 12/883,413 mailed on Jul. 20, 2011, 16 pages.
Extended European Search Report mailed Oct. 7, 2011 in EP Patent Application No. 07798557.0 issued on Oct. 7, 2011, 6 pages.
Final Office Action for U.S. Appl. No. 12/263,982 mailed on Dec. 15, 2011, 14 pages.
European Communication mailed on Feb. 5, 2013 for EP Patent Application No. 08781002.4, 6 pages.
Australian Office Action mailed on Feb. 21, 2013 for AU Patent Application No. 2008268326, 3 pages.
Korean Notice of Non-Final Rejection mailed Jan. 8, 2014 in KR Patent Application No. 10-2009-7000832, 6 pages.
Non-Final Office Action for U.S. Appl. No. 12/264,036 mailed on Feb. 20, 2014, 11 pages.
European Communication mailed Feb. 26, 2014 in EP Patent Application No. 08781002.4, 4 pages.
Notice of Allowance mailed Jun. 2, 2014 in U.S. Appl. No. 12/264,036, 10 pages.
Notice of Allowance mailed Jul. 30, 2014 in KR Patent Application No. 10-2009-7000832, 3 pages.
Notice of Allowance mailed Oct. 16, 2014 in U.S. Appl. No. 12/883,413, 17 pages.
Non-Final Office Action mailed Oct. 21, 2014 in U.S. Appl. No. 12/263,933, 22 pages.

* cited by examiner

SYSTEM AND METHOD FOR ACCOUNT IDENTIFIER OBFUSCATION

CROSS-REFERENCES TO RELATED APPLICATIONS

This patent application claims priority to U.S. Provisional Patent Application No. 60/946,224 filed Jun. 26, 2007, entitled "System And Method For Account Identifier Obfuscation", which is hereby incorporated by reference in its entirety for all purposes. This application is also related to U.S. patent application Ser. No. 11/761,821, filed on Jun. 12, 2007, and Ser. No. 11/398,887, filed on Apr. 5, 2006, which are herein incorporated by reference in their entirety for all purposes.

BACKGROUND

Embodiments of the present invention relate in general to payment transactions, and can apply to contactless smart card transactions involving credit or debit cards associated with an account identifier.

Generally, contactless smart cards are designed to provide a consumer with an efficient method of payment. The smart cards are able to transmit required information to the merchant's point of service (POS) device to complete the transaction by using, for instance, radio frequency (RF) or infrared (IR) signals. The merchant's POS device receives the transmitted information and processes the transaction.

Because contactless smart cards transmit information, security measures are needed to protect the consumer from sophisticated fraudsters who may intercept this information. To provide protection in transactions, a dynamic card verification value (dCVV) can be derived using an account identifier such as an account number. However, this is problematic because the entire account identifier is transmitted unencrypted as it is sent to an issuer associated with the card.

As a result, account information may still be intercepted. Intercepted account information can potentially be used to conduct fraudulent transactions.

One method of countering the theft of sensitive information is to encrypt any transmitted transaction or consumer data. Encryption generally involves encrypting transaction data at one end of a transmission with a key, and then regenerating the original transaction data by decrypting the received encrypted data with the same key at the other end of the transmission. While encryption is effective in preventing information theft, an existing merchant infrastructure requires upgrading to be capable of processing a received encrypted signal from a smart card. Due to the cost, time, and risk of potential business interruption, many merchants, for example, resist making necessary upgrades to their procedures and systems.

Therefore, what is needed is a system and method for obscuring the account information in a manner that prevents an unauthorized user from using the account information. There is a further need for a system and method for obscuring the account identifier that does not require any changes to the installed terminal base or network infrastructure.

It would further be desirable to provide for the ability to authenticate a consumer's card without providing a separate dCVV value in an authentication request message. Authentication request messages contain a small amount of data, since they need to be quickly transmitted to the issuer for approval. If the dCVV value is not included in a dCVV data field in an authorization request message, other useful data could be included therein or less data would need to be transmitted to the issuer.

Embodiments of the invention address the above problems, and other problems, individually and collectively.

SUMMARY

Embodiments of the present invention are directed to methods, systems, and computer readable media that can be used to securely communicate an account identifier associated with a portable consumer device such as a contactless smart card from the portable consumer device or a POS terminal (or some other front-end location), to an issuer or some other service provider entity that wants to verify the authenticity of the portable consumer device. Advantageously, in embodiments of the invention, account information is communicated in a manner that is secure and that does not require updating the existing payment infrastructure in any significant way.

The secure account identifier may be referred to as an "obfuscated account identifier". In embodiments of the invention, the obfuscated account identifier has at least a portion of the account identifier encrypted before the account identifier arrives at the service provider (e.g., the issuer or a payment processing organization such as Visa™).

One embodiment of the invention provides a method for obfuscating an account identifier. The method comprises generating an obfuscated portion using a dynamic cryptogram, which is unique to a transaction. The dynamic cryptogram is determined using a unique derived key. Then, a middle portion of the account identifier is replaced with the obfuscated portion to form an obfuscated account identifier. This method may be performed by a portable consumer device or an access device at a merchant location.

Another embodiment of the invention is directed to a computer readable medium. The computer readable medium comprises code for generating an obfuscated portion using a dynamic cryptogram determined using a unique derived key. The computer readable medium further comprises code for replacing a middle portion of the account identifier with the obfuscated portion to form an obfuscated account identifier. A smart card may comprise this computer readable medium.

Another embodiment of the invention provides a method for decrypting an obfuscated account identifier. The method comprises generating a dynamic cryptogram unique to a transaction. The dynamic cryptogram is determined using a unique derived key. Next, a middle portion of an account identifier is generated using the dynamic cryptogram, and then an obfuscated portion of the obfuscated account identifier is replaced with the middle portion to form the account identifier. This method may be performed by a suitable entity such as a service provider.

Another embodiment of the invention is directed to a computer readable medium. The computer readable medium comprises code for generating a dynamic cryptogram unique to a transaction. The dynamic cryptogram is determined using a unique derived key. Next, a middle portion of an account identifier is generated using the dynamic cryptogram, and then an obfuscated portion of the obfuscated account identifier is replaced with the middle portion to form the account identifier. A server computer may comprise this computer readable medium.

These and other embodiments of the invention are described in further detail below, with reference to the Figures.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
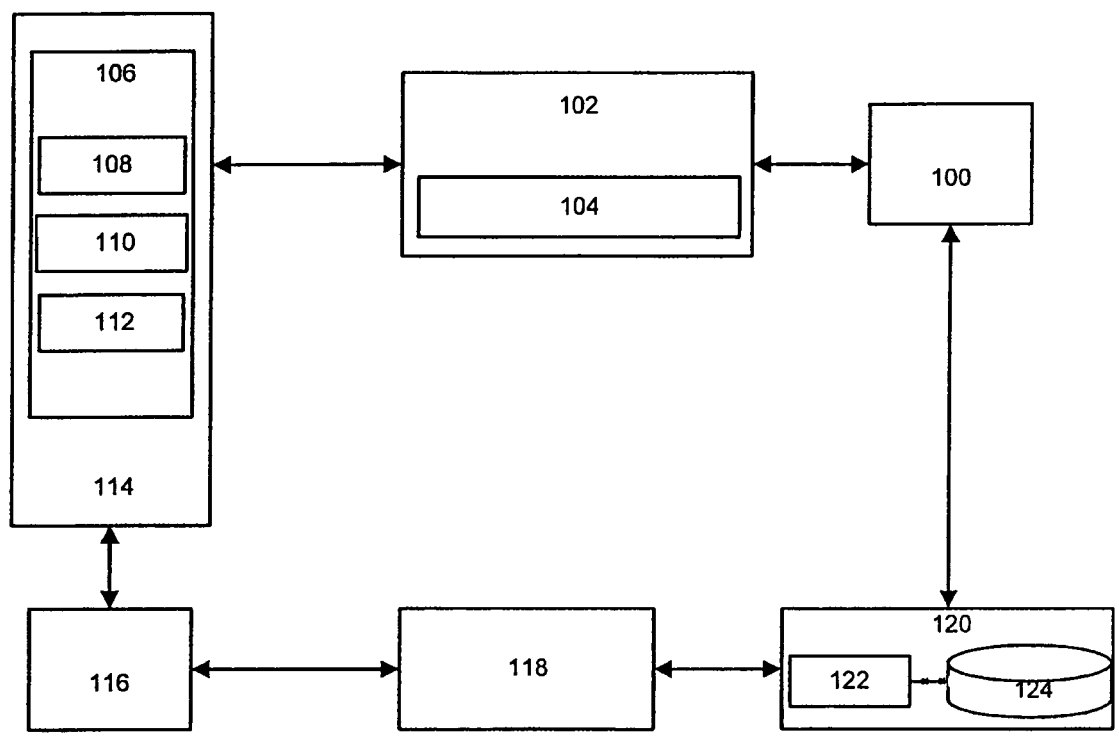
FIG. 1 shows a block diagram illustrating a transaction processing system according to an embodiment of the invention.

As described above, in a conventional payment transaction, the consumer's account identifier is not encrypted when it passes from the consumer's portable consumer device or a POS terminal to a service provider such as an issuer. While encryption of the entire account identifier is possible, it may not be practical under all circumstances. If the account identifier is encrypted, a conventional transaction processing system may not be able to successfully process the transaction. For example, a typical account identifier includes a bank identification number (BIN). The BIN is used to route an authorization request message to the proper issuer or payment processor. If the account identifier is encrypted, then the BIN will change. If the BIN changes, then a proper authorization request message cannot be routed to the correct issuer.

Another restriction associated with encrypting the entire account identifier is related to the need to identify the account associated with a transaction. Consumers want to be able to identify which account is associated with a particular transaction, so merchants print account identifier digits on the purchase receipts. However, privacy and security laws like the federal Fair and Accurate Credit Transaction Act (FACTA) permit no more than five digits of the account identifier to be printed on a transaction receipt. Therefore, merchants typically print the last four digits of the account identifier on the receipt. Thus, if the account identifier is completely encrypted, any numbers printed on the receipt would be meaningless to consumers.

Another restriction associated with encrypting the entire account identifier is related to an error check that is associated with the sequence of digits in an account identifier. Error checking may be achieved using a checksum algorithm that determines if the digits of the account identifier are in the proper sequence. An example checksum algorithm is a modulo 10 algorithm (which is also known as a "Luhn check").

Therefore, encryption of an entire account identifier would corrupt at least the BIN, the checksum, and the ability to identify an account identifier via printed digits on a receipt. In addition, for encryption to be successful, merchants would have to upgrade their POS terminals with appropriate encryption keys, which is burdensome.

The obfuscation process according to embodiments of the invention can be used to protect the account identifier without the need to upgrade the merchant infrastructure to accommodate encryption of the entire account identifier. As will be illustrated in further detail below, embodiments of the invention obfuscate only a portion of an account identifier, which allows the BIN and the last four digits identifying the account to remain unencrypted. In addition, embodiments of the invention can also be used with account identifiers of varying length.

In one embodiment of the invention, a portion of a transmitted account identifier is obfuscated (or changed) by a contactless smart card. A smart card, also called a chip card or IC (integrated circuit) card, is a pocket-sized card with embedded circuitry. Associated with the smart card is an account identifier. An account identifier may be used by a host (e.g., a server computer at an issuer or payment processing organization) to associate an account with a cardholder. In a preferred embodiment, the account identifier consists of 16 decimal digits. In an embodiment, the first six digits of the account identifier comprise the BIN. Digits 7-15 typically form the account number. Digit 16 may be used for a checksum, created using, for example, the Luhn check algorithm. An expiration date may additionally be stored on the smart card. In a preferred embodiment, the expiration date is represented by 4 decimal digits in a YYMM format, wherein YY indicates a year of the expiration date and MM indicates a month of the expiration date.

A number of elements may be stored on the smart cart. In one embodiment, a key is also stored on the smart card. This key, derived from a master key and written to the smart card during personalization, is stored on the smart card at or before issuance to a cardholder, and is preferably known to or derivable by an issuer. In some embodiments, the account identifier, expiration date, and key remain static from transaction to transaction (at least until a new card is issued). In addition to the key, a transaction counter (TC) may also be stored on the smart card. In one example, the TC is a 16 bit value, and is incremented for each transaction. However, other TC update operations are possible, such as daily incrementing, or incrementing or decrementing by a value other than 1, or incrementing or decrementing by a variable value.

An embodiment of the present invention randomly obfuscates the middle five digits of an account identifier while maintaining the integrity of the first six digits (i.e., the BIN) and last four digits of the account identifier, as well as the check digit for the Luhn check. Instead of a BIN, a merchant location identifier, financial institution location identifier, or even an Internet Protocol (IP) address could be part of the account identifier and can remain static. The middle five digits of the account identifier are obfuscated because five obfuscated digits provide sufficient security, while still allowing the BIN and the last four digits of the account identifier to be in the clear when the account identifier information is transmitted from a merchant to an issuer or other service provider. As previously mentioned, this is advantageous, as it is therefore not necessary to regenerate the middle five digits of the account identifier before routing the transaction to the appropriate issuer, if such routing is required. This is further advantageous in that the last four digits of the account identifier may appear on a consumer's receipt. The consumer will not notice any change from conventional transaction receipts.

Although obfuscating five digits provides a certain measure of security, a further measure of security is gained because the obfuscated portion changes with each transaction. This is advantageous because even if the account identifier is skimmed, the number gained will be useless because it will be invalid if used in a subsequent transaction. Furthermore, a sixth middle digit also provides security. The sixth middle digit is selected to satisfy the Luhn check of the account identifier after the middle five digits have been obfuscated. Thus, there is a total of six digits in a preferred embodiment that are obfuscated. The middle portion can vary in length, either shorter or longer.

FIG. 1 shows a system that can be used in an embodiment of the invention. The system includes a merchant 114 and an acquirer 116 associated with the merchant 114. The acquirer 116 communicates with an issuer 120 via a payment-processing network 118. The acquirer 116 is typically a bank that has a merchant account. The issuer 120 may also be a bank, but could also be a business entity such as a retail store. Some entities are both acquirers and issuers, and embodiments of the invention include such entities. The issuer 120 may include a server computer 122 and a database 124.

The consumer 100 may be an individual or an organization such as a business that is capable of purchasing goods and services.

The portable consumer device 102 may comprise a radio-frequency contactless element 104. The radio-frequency contactless element 104 may include a computer chip (not shown) configured to store a transaction counter, an account identifier, an expiration date, and encryption keys. The radio-frequency contactless element 104 is configured to determine and transmit an obfuscated account identifier. Examples of portable consumer devices include contactless smart cards such as credit or debit cards, wireless phones, PDAs (personal digital assistants), key fobs, etc. Other examples of portable consumer devices are provided below.

The merchant 114 in FIG. 1 has an access device 106 located at the merchant 114, but the access device 106 may be located at any other suitable location in other embodiments of the invention. The access device 106 may include a reader 108, a processor 110, and a computer readable medium (CRM) 112. Examples of access devices include point of sale (POS) terminals, cellular phones, personal digital assistants (PDAs), personal computers, handheld specialized readers, set-top boxes, electronic cash registers, automated teller machines (ATMs), virtual cash registers, kiosks, security systems, access systems, and the like.

The payment processing network 118 may include data processing subsystems, networks, and operations used to support and deliver authorization services, exception file services, and clearing and settlement services. The payment processing network 118 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 118 may use any suitable wired or wireless network, including the Internet.

Figure 2:
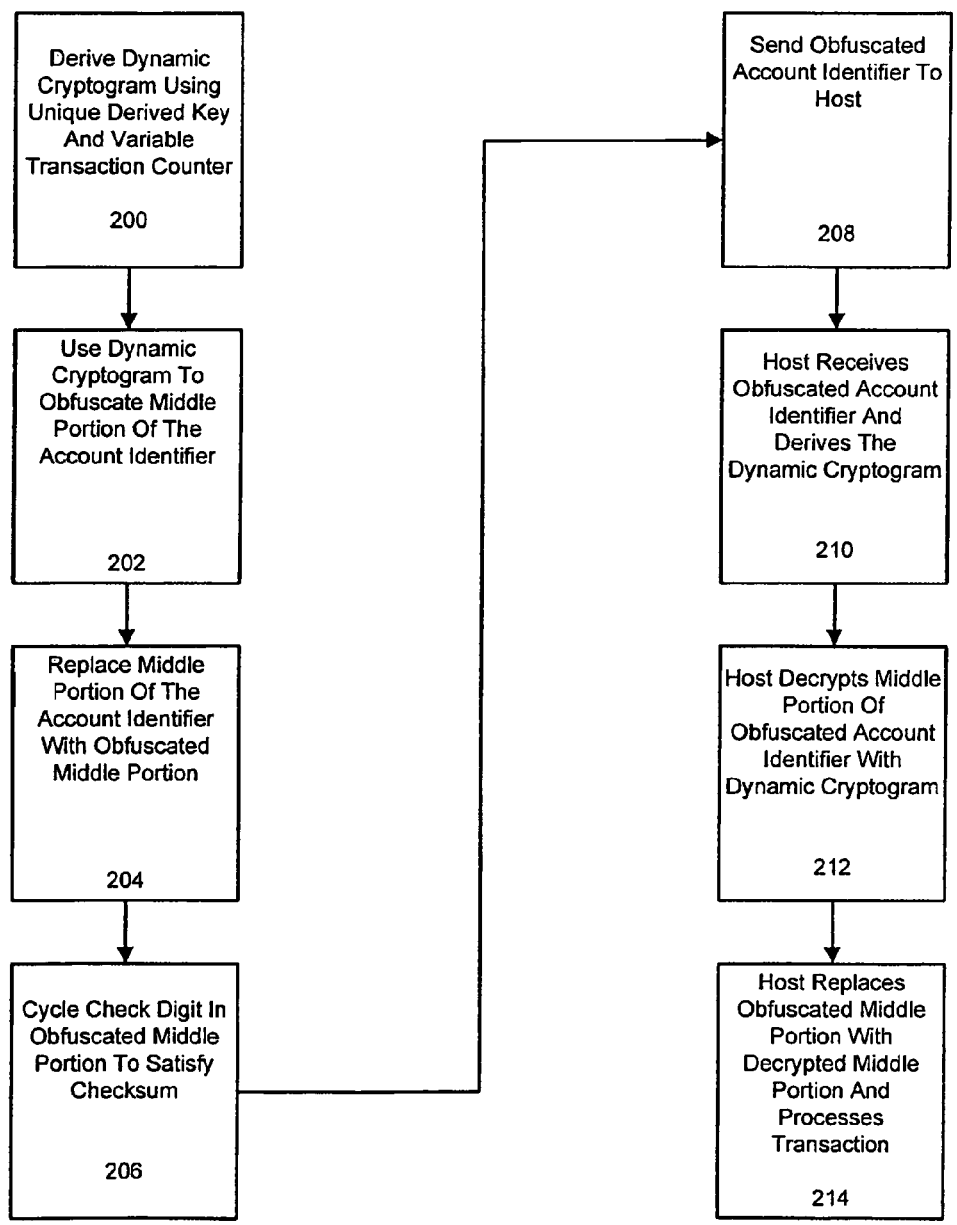
FIG. 2 shows a flow chart illustrating a method of communicating obfuscated account identifier information according to an embodiment of the invention.

One embodiment of the invention provides a method for obfuscating an account identifier. The method comprises generating an obfuscated portion using a dynamic cryptogram, which is unique to each transaction. The dynamic cryptogram is determined using a unique derived key. Then, a middle portion of the account identifier is replaced with the obfuscated portion. In some embodiments, the obfuscated portion may be determined using all or part of the dynamic cryptogram, using one or more data alteration method (e.g., encryption methods). In other embodiments, the obfuscated portion could be some part or all of the dynamic cryptogram. The method may be performed by a portable consumer device or an access device at a merchant location FIG. 2 shows a flowchart illustrating a method of obfuscating (or encrypting) and unobfuscating (or decrypting) the account identifier. In this embodiment, the dynamic cryptogram, unique to the instant purchase, is determined using a unique derived key and a variable transaction counter (step 200). After the dynamic cryptogram is determined, it is then used to generate an obfuscated middle portion i.e. to obfuscate a middle portion of the account identifier (step 202). The obfuscated middle portion is used to replace the middle portion of the account identifier (step 204). In some embodiments, because the new obfuscated middle portion changes a prior checksum calculation (e.g., a Luhn check), a new check digit is determined. In some embodiments, one of the middle digits is cycled from a value of 0-9 until the checksum is validated (step 206). After the checksum has been validated with the new check digit, the obfuscated account identifier is transmitted to the host (e.g., a server computer at a service provider) (step 208).

Upon receiving the obfuscated account identifier, the host determines a dynamic cryptogram using a unique derived key (step 210). The dynamic cryptogram is used to unobfuscate the middle obfuscated portion of the received account identifier (step 212). Upon generating the middle portion, the host then replaces the obfuscated middle portion with the newly generated middle portion to form the account identifier (step 214). The host can then verify if the unencrypted account identifier is valid. If it is not valid, a fraud alert can be set. A fraud alert may make the host, the merchant, and/or the user aware that unauthorized use of an account identifier may be occurring. The alert may comprise any number of solutions such as an e-mail, phone call, instant message, internet communication, or combination of methods suitable for alerting a party of potential fraud.

Figure 3:
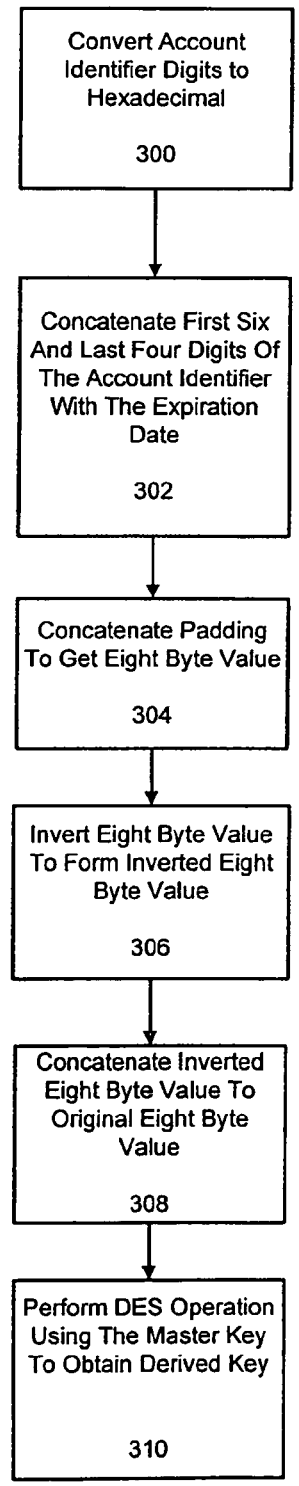
FIG. 3 shows a flow chart illustrating the creation of a derived key according to an embodiment of the present invention.

A method for obfuscating an account identifier by replacing several digits of the account identifier with cryptographically derived digits is disclosed with reference to FIG. 3. FIG. 3 illustrates the process of creating a unique derived key, which may be used to create a transaction-specific cryptogram according to a preferred embodiment. A unique derived key is the result of an encryption process that encrypts unique inputs with a master key. An example encryption process is triple data encryption standard (3DES). Other methods for forming uniquely derived keys may be found in U.S. patent application Ser. No. 10/642,878, filed on Aug. 18, 2003 to Sahota et al., which is herein incorporated by reference in its entirety for all purposes.

Referring to FIG. 3, first, the account identifier is converted from decimal digits to hexadecimal (step 300). Then, the first six and last four digits of the account identifier, with each decimal digit represented in hexadecimal, are concatenated with the expiration date (step 302). The expiration date is represented by four digits. Each hexadecimal digit can be equivalent to 4 bits or half a byte. Therefore, the result of the concatenation can be a 7 byte value (e.g., 6 digits for the account identifier, 4 digits for the last four digits of the account identifier, and 4 digits for the expiration date is equal to 14 digits, where each digit is half of a byte).

In the preferred method, a triple DES (3DES) encryption algorithm, which can use a 16 byte input value, is used. To generate the 16 byte value, the 7 byte value created above can be concatenated with hexadecimal digits FF (1 byte) in order to pad the value out to 8 bytes (step 304). Now that half (8 bytes) of the input to the 3DES operation is created, this value is then inverted to create another 8 byte value to serve as the second half of the 3DES input (step 306). To invert the 8 byte value, the value is converted to binary, and then each binary digit is swapped. For example, if the result (in binary) is 11010011, then the inverted result would equate to 00101100. The inverted 8 byte value is converted to hexadecimal and concatenated to the original 8 byte value to form a 16 byte value acceptable for a 3DES operation (step 308). This 16 byte quantity is then input into a 3DES operation as the message (step 310).

The key for this 3DES operation is a master key. The master key may be either sixteen or twenty-four bytes depending on the variant of DES selected (e.g., using two different keys (2TDES) or three different keys (3TDES)). The output of this 3DES operation is a double-length sixteen byte unique derived key. A master key may be unique to each issuer, and generally, the master key is only known by the issuer to provide security. Therefore, as is apparent, the derived key need not be calculated at transaction-time, but instead may be calculated at or before issuance of a portable consumer device to a cardholder. If the derived key is calculated at or before card personalization, the master key need not be stored on the card, resulting in increased security.

Figure 4:
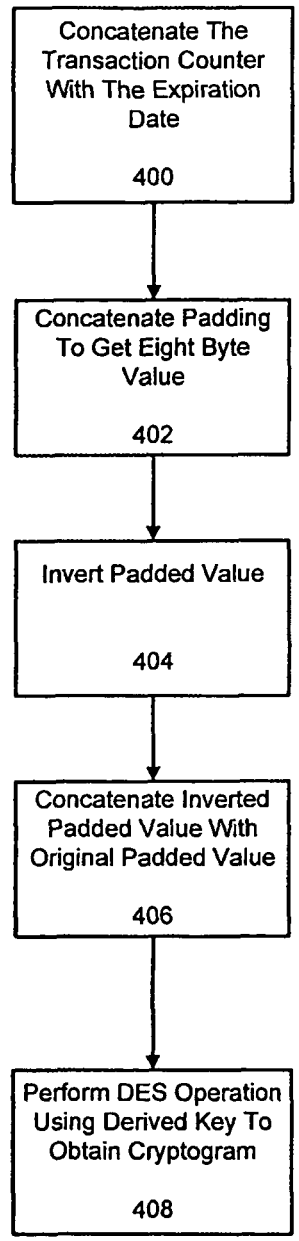
FIG. 4 shows a flow chart illustrating the creation of a dynamic cryptogram according to an embodiment of the present invention.

FIG. 4 illustrates the creation of the dynamic cryptogram to be used in obfuscating the middle digits of the account identifier according to one embodiment. To prevent the unauthorized use of the obfuscated account identifier by a potential skimmer, the middle portion of the obfuscated account identifier is varied with each transaction. In order to provide the unique obfuscated digits for each transaction, the cryptogram used to generate the obfuscated digits can vary with each transaction. When a consumer wants to conduct a transaction, the TC is concatenated with the expiration date (step 400). As explained before, the TC changes with each transaction, and if this changing value is used to determine the cryptogram, the cryptogram will also change with each transaction. Alternatively, another variable data element (e.g. a time stamp) could be used instead of or in addition to the TC to provide the dynamic cryptogram.

The dynamic cryptogram can be generated using the same 3DES operation used in the creation of the unique derived key. The key for this operation is the unique derived key, and the input can be a 16 byte value. The TC can be a 2 byte value and the expiration date can be a 2 byte value. Thus, to generate an 8 byte value that can be inverted and concatenated with the original 8 byte value (as explained with reference to FIG. 3), 4 bytes of padding are also concatenated (step 402). In some embodiments, the expiration date is concatenated with the TC, and is then padded out to eight bytes with hexadecimal (FFFF FFFF). This eight byte value is then inverted (step 404). The inverted value is then concatenated with the original value to form a 16 byte input value suitable for a 3DES operation (step 406). The 3DES operation uses this input and the unique derived key to determine the cryptogram that will be used to uniquely obfuscate the middle portion of the account identifier (step 408).

It is to be understood that the above described method of constructing a cryptogram is illustrative, and is not intended to be limiting. For instance, it is possible to use ciphers other than 3DES. It is further possible to use inputs to the cipher other than those inputs used above. Further, it is not necessary to derive a key, as the master key may be used in lieu of the derived key. One of ordinary skill in the art will understand that additional modifications are possible while remaining within the scope of the present invention.

Figure 5:
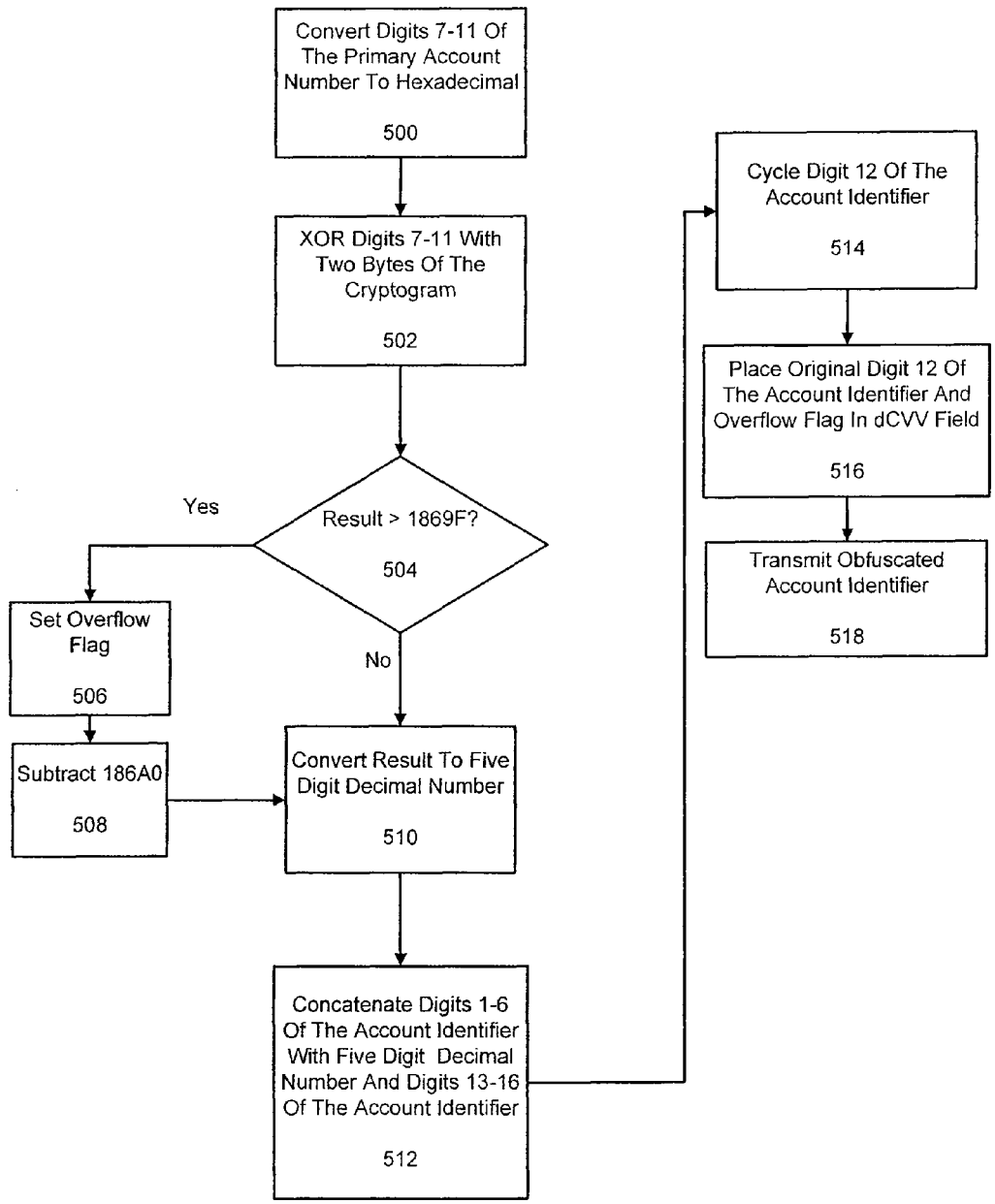
FIG. 5 shows a flow chart illustrating the construction of an obfuscated account identifier according to an embodiment of the present invention.

FIG. 5 illustrates the derivation of five decimal digits to replace five decimal digits of the account identifier according to an embodiment of the invention. FIG. 5 further illustrates the creation of an obfuscated account identifier that is sixteen digits long.

First, each of digits 7-11 of the account identifier is converted into hexadecimal, resulting in a three byte hex value when zero-filled on the left (step 500). For example, if the middle digits are (99999), then the decimal conversion would be (1001 10011001 10011001), which is 4 bits short of a full 3 bytes since there are only 5 digits (2 digits=1 byte). Thus, zero filling on the left creates a full 3 byte value: (00001001 10011001 10011001) or (099999) in hexadecimal.

Then, this three byte hex value is bitwise XORed with two bytes of the cryptogram, zero-filled on the left to expand the cryptogram out to three bytes (step 502). In an embodiment, the last two bytes of the cryptogram are used for this XOR operation, the result of which is a three byte raw value. If the resulting raw value is greater than a first constant (1869F) (step 504), an overflow flag is set (step 506). Hexadecimal (1869F), converted to decimal is (99999), which is the largest number that can replace the five middle digits. Anything larger would result in six digits. Therefore, if the result is larger, the overflow flag is set, and a second constant, hexadecimal (186A0) (which in decimal equates to 100000), is subtracted from the raw value to limit the result to five digits (step 508). The overflow flag is preferably placed in a field associated with the account identifier called the dynamic card verification value (dCVV). If the result of the XOR operation is equal to or less than hexadecimal (1869F), then no overflow flag is set and the operation proceeds directly from step 504 to step 510.

The dCVV field is used to store the overflow flag because in some embodiments, the dCVV value is not needed. Typically, the dCVV value provides extra security in standard transactions as it is used by an issuer or other service provider to authenticate a portable consumer device such as a smart card. However, the function of the dCVV is replaced by the obfuscated portion, because the obfuscated portion provides greater security that the dCVV value provides. The dCVV value is three digits. Because the obfuscated portion is preferably at least five digits in embodiments of the invention, the obfuscated portion provides increased security over the dCVV value. Longer verification values generally provide greater security than shorter values. Additionally, since the dCVV data field in an authorization request message is used to store, for example, an overflow flag, no alteration or modification of existing software or hardware is required to perform embodiments of the invention.

Figure 7:
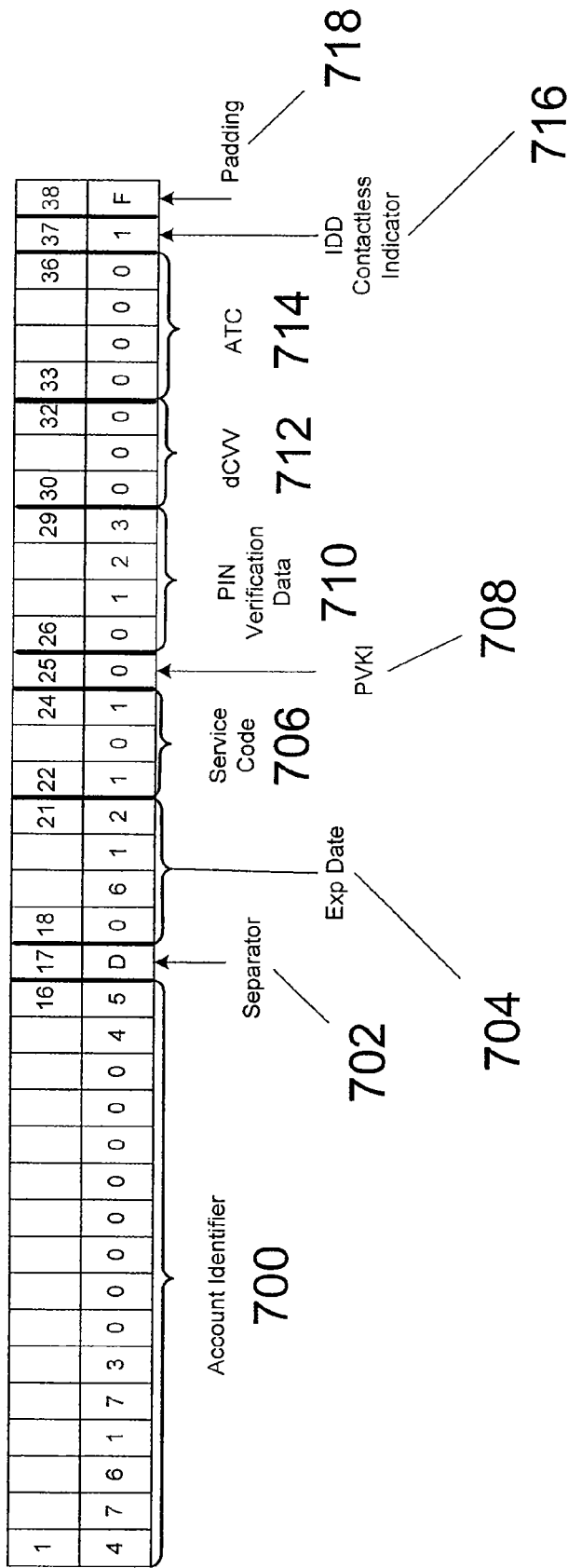
FIG. 7 shows a schematic illustration of an exemplary record format including transaction data in a data field.

FIG. 7 illustrates an example of transaction data in a record format as it would be present in various data fields including a dCVV data field 712. The transaction data may be stored in a memory in a portable consumer device such as a smart card.

In FIG. 7, an account identifier 700 occupies the first 16 digits. Next, a separator 702 provides a buffer between the account identifier 700 and the expiration date 704. The service code 706 follows the expiration date 704. Then, a personal identification number (PIN) verification indicator (PVKI) 708 and the PIN verification data 710 follow. Finally, the dCVV field 712, the transaction counter 714, a contactless indicator 716, and padding 718 complete the data fields.

Returning to FIG. 5, the resulting value from either step 504 or step 508 is converted into a five digit decimal number (step 510). This five digit decimal number is intended to replace digits 7-11 of the account identifier. The first six digits of the account identifier are concatenated with the five digit decimal number and the last four digits of the account identifier (step 512). This results in the obfuscated account identifier.

Then, digit 12 (or another digit) is then cycled (0 through 9) until a value is found such that a checksum of the obfuscated account identifier matches the checksum of the original account identifier. The original value of digit 12 is stored in the dCVV field with the overflow flag (step 516). Because digit 12 (or some other digit) may be changed to satisfy the checksum, this also contributes to the obfuscation of the middle digits. The obfuscated account identifier, expiration date, TC, and dCVV field are then transmitted, unencrypted, to the host as part of a transaction (step 518). As is apparent, the first six digits and last four digits of the obfuscated account identifier are identical to the first six digits and last four digits of the account identifier. This is desirable in some circumstances because, in some payment networks, the first six digits serve to route the message to the correct issuer. Further, the last four digits may appear on a customer's receipt to identify the card used in the transaction.

Figure 6:
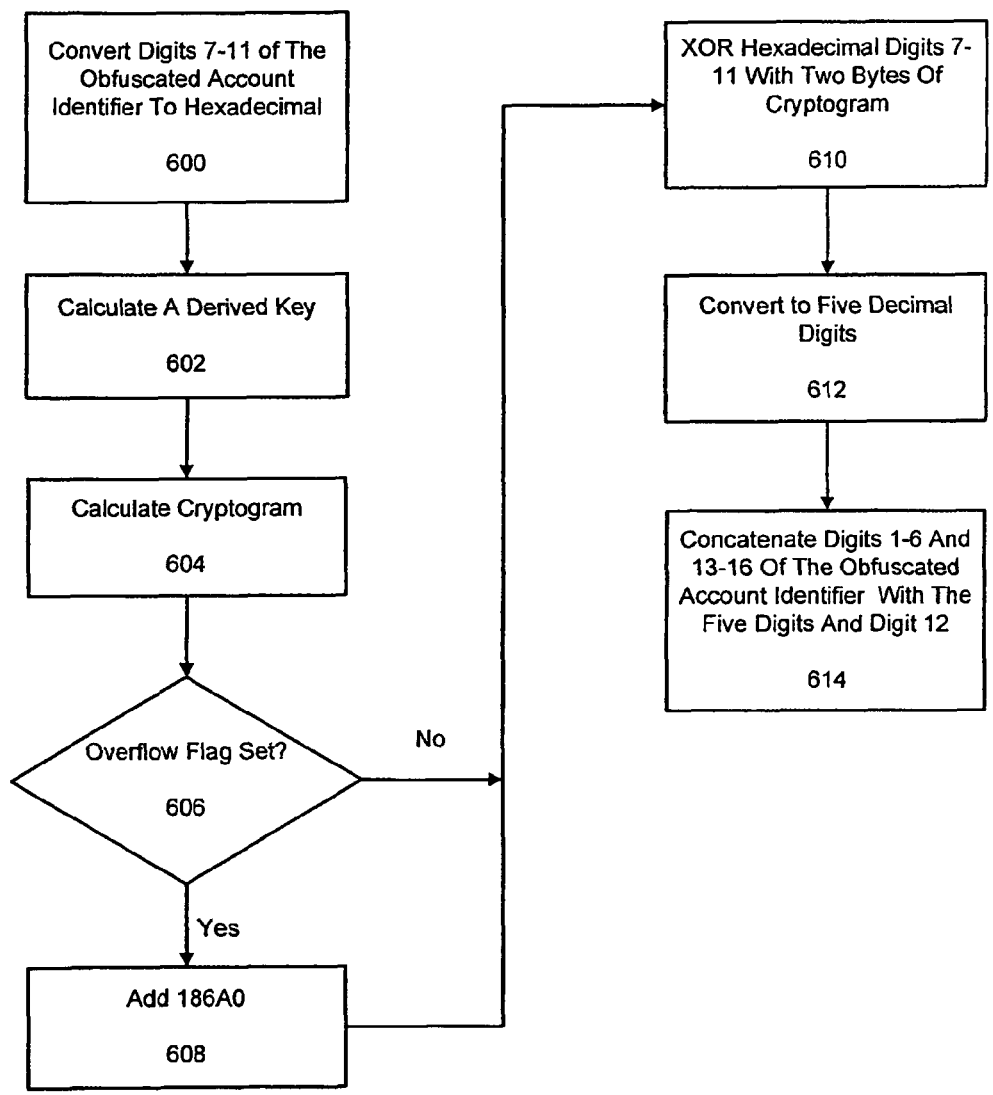
FIG. 6 shows a flow chart illustrating the generation of the account identifier at the host according to an embodiment of the present invention.

FIG. 6 illustrates the generation of the account identifier from the obfuscated account identifier in a preferred embodiment. The account identifier may be generated by the host from the obfuscated account identifier, the transaction counter, and the information in the dCVV field, namely the original twelfth digit, and the overflow flag.

Upon receiving a number that appears to be an account identifier or an obfuscated account identifier, the host may determine whether the received number is first a valid account identifier or whether the host may need to generate the account identifier from the received number using the method described in FIG. 6. As is apparent, if the received number is a valid account identifier, then applying the method in FIG. 6 would result in an invalid account identifier. In one embodiment, the host may attempt to process the received number as a valid account number, and if the received number fails, then apply the method of FIG. 6. Alternatively, a field associated with the account identifier may store an indicator that the received number is an obfuscated account identifier. Numerous other methods could be used to indicate to a host that the received number is obfuscated.

In addition, once the host determines that the received number is an obfuscated account identifier, the host may determine which digits comprise the obfuscated portion of the obfuscated account identifier if this information is not known in advance by the host. For example, in one embodiment, a smart card could randomly select which middle digit will be the check digit. Preferably, digits 7-11 serve as the obfuscated portion with digit 12 being the new check digit. However, to provide added security, the check digit, for example, could be randomly chosen among digits 7-12 to be digit 8 leaving digits 7, and 9-12 to be obfuscated. In another example, instead of digits 7-12, digits 7, 9, and 12 might be chosen to be obfuscated. Advantageously, this provides additional security because even if a fraudster could decode obfuscated digits, the fraudster would still need to know which digits to decode. A field associated with the account identifier may store an indicator as to which digits are obfuscated.

Referring to FIG. 6, first, each of digits 7-11 of the obfuscated account identifier can be converted to hexadecimal, resulting in a three byte hexadecimal value (step 600). Then, a unique derived key is calculated as described above with respect to FIG. 3 (step 602). This unique derived key can be calculated using the first six and last four digits of the obfuscated account identifier (which, as is apparent, are identical to the first six and last four digits of the account identifier). The unique derived key can be identical to the derived key discussed above with respect to FIG. 3. Then, a cryptogram is calculated as described above with respect to FIG. 4 (step 604). This cryptogram is calculated using the TC, expiration date, and derived key. Once again, this cryptogram is identical to the cryptogram discussed above with respect to FIG. 4.

If the overflow flag is set in the dCVV field (step 606), then hexadecimal value 186A0 is added to the three byte value determined in step 600 (step 608). Otherwise, the method proceeds to step 610 where the three byte hexadecimal value is bitwise XORed with the last two bytes of the cryptogram to form a raw value. Then, the raw value of the XOR operation is converted to five decimal digits (step 612). These five decimal digits are identical to digits 7-11 of the account identifier. Finally, the first six digits of the obfuscated account identifier, the five decimal digits, the original twelfth digit (received in the dCVV field), and the last four digits of the obfuscated account identifier are concatenated together to form the account identifier at the host (step 614). If the result of this process is not a valid account identifier or otherwise indicates a fraudulent attempt to complete a transaction, then the host may set a fraud alert.

In some embodiments, in order to reduce the processing load at the host at the expense of memory usage, instead of regenerating digits 7-11 of the account identifier at the host, a lookup table may be used. In an embodiment, the obfuscated account identifier may be an entry, preferably created at issuance, in a lookup table corresponding to digits 7-11 of the account identifier. The entry may be created by iterating, at issuance, through the process outlined in FIGS. 1-3 to generate the obfuscated account identifier at the host and placing an entry in the lookup table corresponding to the same.

In the manner shown above, a host may regenerate an account identifier from an obfuscated account identifier. Further, the obfuscated account identifier may be transmitted unencrypted without fear of compromising the account identifier. Further, the format of data transmitted from the smart card to the host, often by means of a terminal at a point of sale, including the obfuscated account identifier, expiration date, and dCVV field (containing an overflow flag and the original twelfth digit) is compatible with the installed terminal base.

As is apparent, there is no way to directly derive the account identifier from the data sent from the smart card to the host (i.e., the obfuscated account identifier, transaction counter, expiration date, and dCVV) without knowledge of the master key or derived key, or a brute force replacement of the digits 7-11 of the obfuscated account identifier. Although a brute force attack on five decimal digits would be a relatively simple brute force attack, this attack must be launched against the host. Therefore, the systems and methods described herein should preferably be combined with a brute force attack detection system located at the host. Thus, this attack is easily detected and thus thwarted.

Referring to FIG. 1 in an exemplary embodiment, a consumer 100 may purchase goods or services at the merchant 114 using a portable consumer device 102, such as a contactless smart card or credit card. The portable consumer device 102 interacts via the radio-frequency transponder 104 with the reader 108 of the access device 106, such as a POS terminal, at the merchant 114 in a contactless manner. During the interaction, the portable consumer device 102 determines an obfuscated account identifier and transmits, via the radio-frequency transponder 104, the obfuscated account identifier to the reader 108 of the access device 106 at the merchant 114.

Figure 8:
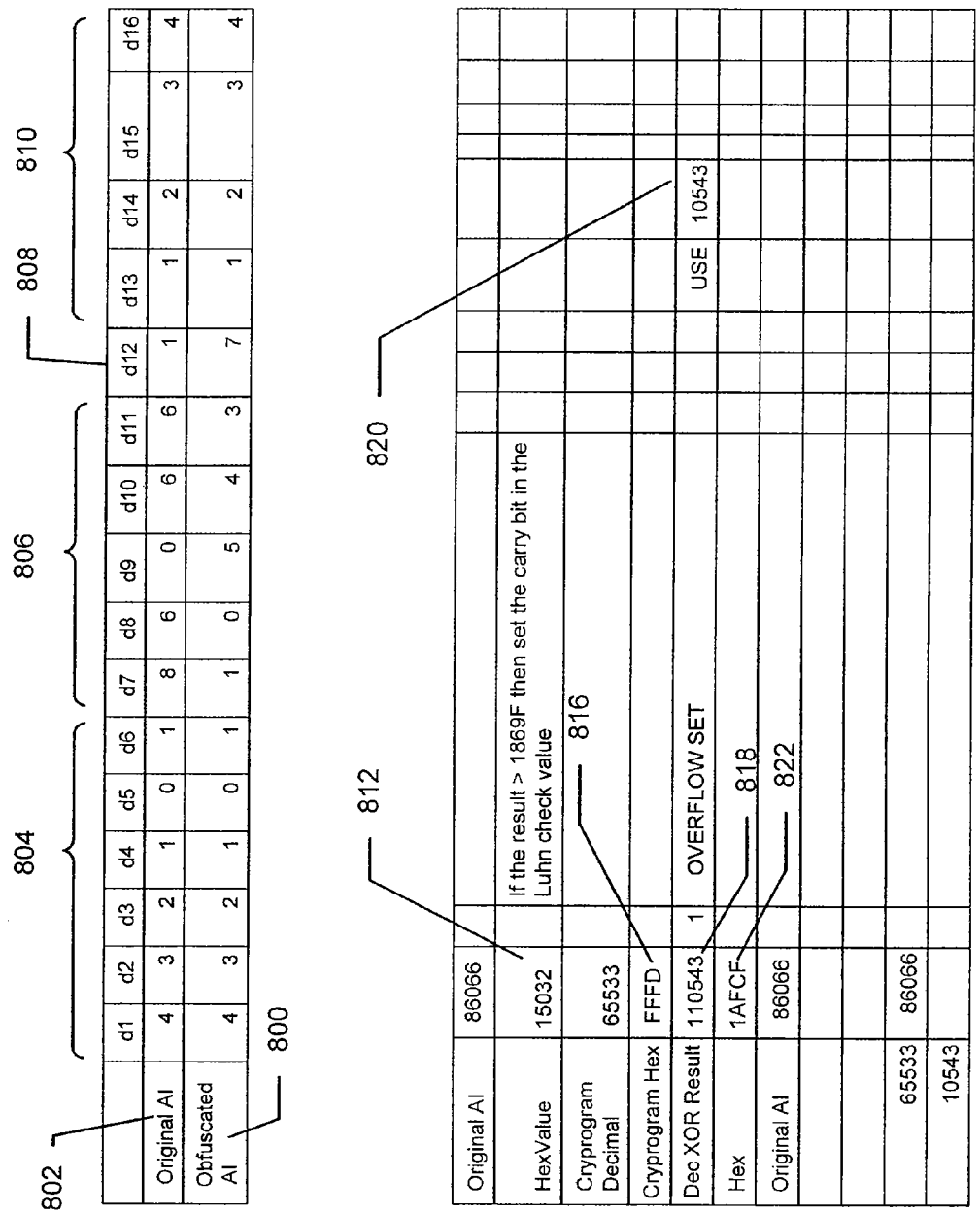
FIG. 8 shows an example illustrating an embodiment of a method of obfuscating an account identifier.

FIG. 8 illustrates an exemplary determination of the obfuscated account identifier using the methods disclosed above. In this example, an original account identifier 802 is obfuscated to yield an obfuscated account identifier 800. Digits 1-6 of the account identifier represent the BIN 804. Digits 13-16 are the digits used by the consumer to identify the consumer's account 810. Digits 7-11 806 represent the obfuscated portion. Digit 12 808 is changed to satisfy the checksum calculation with the obfuscated account identifier.

The first step that is performed by the portable consumer device 102 is to determine a unique derived key as disclosed in FIG. 3. The unique derived key is unique because it is based on the first six and last four digits of the original account identifier. In this example, those digits would be (432101) and (1234). Using the unique derived key, a dynamic cryptogram can be determined as disclosed in FIG. 4. In this example, a value of (FFFD) is used for the dynamic cryptogram 816.

Next, applying the method disclosed in FIG. 5 and with reference to FIGS. 1 and 8, step 500 converts digits 7-11 of the original account identifier to hexadecimal. The original digits are (86066), and when converted to hexadecimal, the result is (015032) 812. In step 502, hexadecimal digits 812 are used in an Exclusive-OR (XOR) operation with the previously calculated cryptogram (FFFD) 816. The result of the XOR operation is hexadecimal (1AFCF) 822. The digital equivalent of (1AFCF) is (110543) 818. Referring to step 504, because (1AFCF) is greater than (1869F) (decimal equivalent=99999), an overflow flag is set 506, and the result 822 is reduced by a fixed value of (186A0) (decimal equivalent=100000) in step 508 to yield (292F). Step 510 converts hexadecimal (292F) to decimal equivalent (10543) 820. These digits represent the obfuscated account portion of the account identifier, and in step 512, they replace digits (86066) of the original account identifier as shown in obfuscated account identifier 800. Finally, step 514 cycles digit 12 until a value is found that satisfies the Luhn check using digits (10543) in place of the original (86066) digits. In this example, digit 12 needs to be set to 7, so the original value of 1 is stored in a dCVV field as indicated by step 516, and digit 12 is replaced with a 7. Thus, the resulting obfuscated account identifier 800 is (4321 0110 5437 1234). This number is transmitted (step 518), for example, from the portable consumer device 102 to the merchant's access device 106. In this example, only a designated party with a valid master key will be able to decrypt this obfuscated account identifier and determine the original account identifier (4321 0186 0661 1234) using the method disclosed in FIG. 6.

Once the merchant 114 receives the obfuscated account identifier, it is transmitted in an authorization request message (which may include a transaction amount, merchant category code, etc.) to the issuer 120 via the acquirer 116 and the payment processing network 118. Once the authorization request is received by the issuer 120, the issuer's server 122 (which can serve as the previously described "host") can retrieve information from the database 124 to determine the original account identifier using the received obfuscated account identifier. If the original account identifier is valid, then the issuer 120 may determine if there are sufficient funds or credit in the consumer's account to conduct the current transaction. If there are insufficient funds or credit, an authorization response message indicating that the transaction is not approved is sent back to the access device 106 via the acquirer 116, and the payment processing network 118. If there are sufficient funds or credit, then the authorization response message would indicate that the transaction is approved. A clearing and settlement process can then occur at the end of the day.

Some variations are also possible. For example, instead of the issuer 120, the payment processing network 118 could serve as the host which determines the original account number from the unobfuscated account number. Also, in some embodiments, the access device 106 could generate the obfuscated account number instead of the portable consumer device 102. In these embodiments, the portable consumer device 102 could simply pass consumer information such as an account number and expiration date to the access device 106, and the access device may determine the obfuscated account number as described above. Further, although the embodiments described above are in the context of a "card present" type of transaction where a consumer is using a portable consumer device to conduct a transaction at a merchant with a physical location, it is understood that embodiments of the invention may also be used in "card not present" situations where a computer terminal is transmitting an obfuscated account number to a host.

Note that in the embodiments just described with reference to FIG. 1, and other Figures, the determination of the original account identifier at the host not only provides the original account identifier at the host, but also authenticates the portable consumer device 102 without using a separate dCVV. This is because the obfuscated portion of the obfuscated account identifier is derived from a transaction counter, which can be used to determine if the correct transaction is being conducted. For instance, if the host correctly determines the original account number from the obfuscated account number, then the transaction counter at the host would match the transaction counter on the portable consumer device. This would indicate that the portable consumer device is authentic and that no skimming has taken place. Conversely, if the host cannot determine the original account number from the obfuscated account number, then the host may determine that the data has been skimmed. The transaction counter used to form the obfuscated portion of the obfuscated account number and the transaction counter at the host would not match in this case, thus, indicating possible skimming. Some embodiments of the invention can be advantageously conducted without using a 3 digit dCVV. Embodiments of the invention advantageously allow for the secure transmission of data from a front end to a back end of a transaction, while also providing for an effective way to authenticate a device (e.g., a portable consumer device) at a front end of the transaction.

Other embodiments of the invention are also possible which do not require any processing on a smart card or other portable consumer device. In an embodiment, the smart card does not store the account identifier, even though the account identifier may be embossed on the card. Rather, the smart card stores two numbers. The first is a masked account identifier, identical to the account identifier except for the fact that digits 7-12 are masked out, preferably with zeros, and that digit 12 is recalculated to satisfy the Luhn check. This masked account identifier may be stored on the smart card where an account identifier would typically be stored. Further, digits 7-12 of the account identifier are encrypted, preferably using 3DES and a master key known only to the host, to create an account identifier cryptogram, 64 bits long if 3DES is used. Encrypted digits 7-12 are also stored on the smart card, preferably in a supplemental data field.

When a contactless transaction takes place, the card reader (or other access device) reads both the masked account identifier and the account identifier cryptogram, and sends the masked account identifier and the account identifier cryptogram, together with other transaction information, to the host for authorization. At the host, the master key is used to decrypt the encrypted account identifier, thereby regenerating digits 7-12 of the account identifier, which may then be combined with digits 1-6 and 13-16 of the masked account identifier to regenerate the account identifier. If the host is also the issuer, the host then performs the authorization, and sends a response to the reader at a point of sale. If the host is not the issuer (but is instead, for example, a payment service), then the account identifier may be forwarded to the appropriate issuer for authorization. Thus, this encryption would be transparent to the issuer authorization process.

This alternative method of obfuscating an account identifier has some advantages over the earlier solution. For instance, there need be no calculations performed on the smart card, and no key stored on the smartcard. Further, the issuer need not change its authorization procedures.

It is to be understood that there are a number of ways in which an account identifier may be obscured while still remaining within the scope of the present invention. For instance, rather than using a 3DES operation to generate the cryptogram and the derived key, other block ciphers or cryptographic transformations may be used.

Examples of portable consumer devices and computer apparatuses that can be used in embodiments of the invention are described below.

Figure 9A:
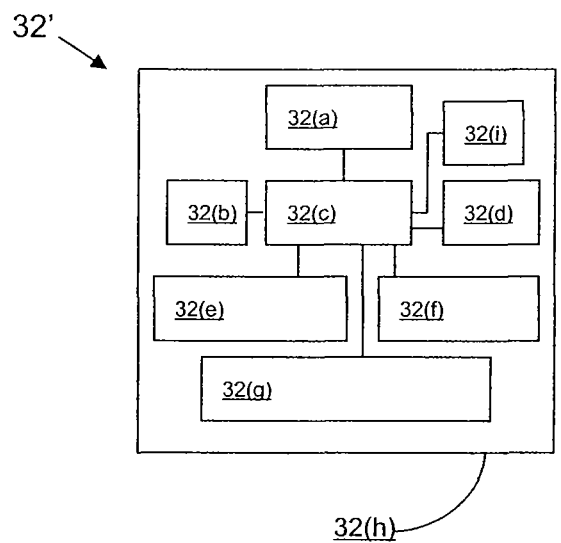
FIG. 9(a) shows a block diagram of a phone.
Figure 9B:
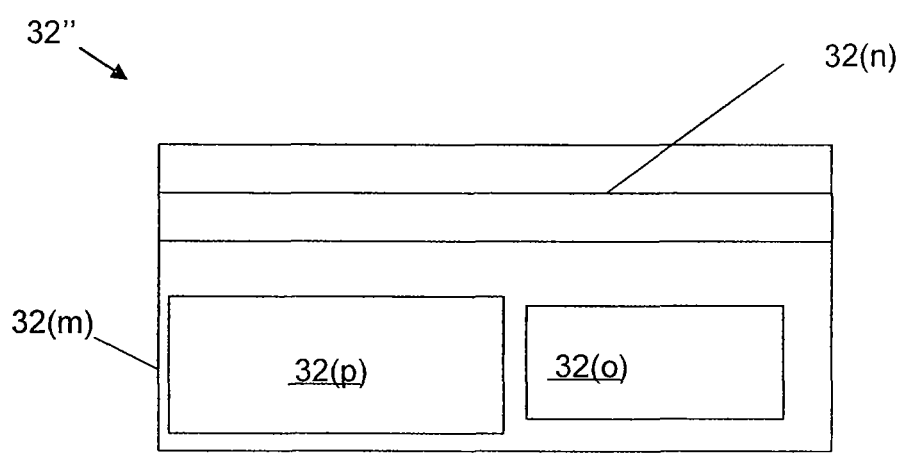
FIG. 9(b) shows an illustration of a payment card.

FIGS. 9(a)-9(b) show block diagrams of portable computer devices and subsystems that may be present in computer apparatuses in systems according to embodiments of the invention.

The portable consumer device 102 (shown in FIG. 1) may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

An exemplary portable consumer device 32' in the form of a phone may comprise a computer readable medium and a body as shown in FIG. 9(a). (FIG. 9(a) shows a number of components, and the portable consumer devices according to embodiments of the invention may comprise any suitable combination or subset of such components.) A computer readable medium 32(b) may be present within a body 32(h), or may be detachable from it. The body 32(h) may be in the form of a plastic substrate, housing, or other structure. The computer readable medium 32(b) may be a memory that stores data and may be in any suitable form including a magnetic strip, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32'.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and the optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit the consumer's voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 32" in the form of a card is shown in FIG. 9(b). FIG. 9(b) shows a plastic substrate 32(m). A contactless element 32(o) for interfacing with an access device 34 may be present on or embedded within the plastic substrate 32(m). A consumer information region 32(p) may include information such as an account number, expiration date, and consumer name, which may be printed or embossed on the card. Further, a magnetic strip 32(n) may also be on the plastic substrate 32(m) and may be an example of a computer readable medium. In this embodiment, the portable consumer device 32" may or may not have a processor. If it does not, then a corresponding access device may be used to form a dynamic verification value using information stored on the magnetic strip 32(n).

As shown in FIG. 9(b), the portable consumer device 32" may include both a magnetic strip 32(n) and a contactless element 32(*o*). In other embodiments, both the magnetic strip 32(*n*) and the contactless element 32(*o*) may be in the portable consumer device 32". In other embodiments, either the magnetic strip 32(*n*) or the contactless element 32(*o*) may be present in the portable consumer device 32".

Figure 10:
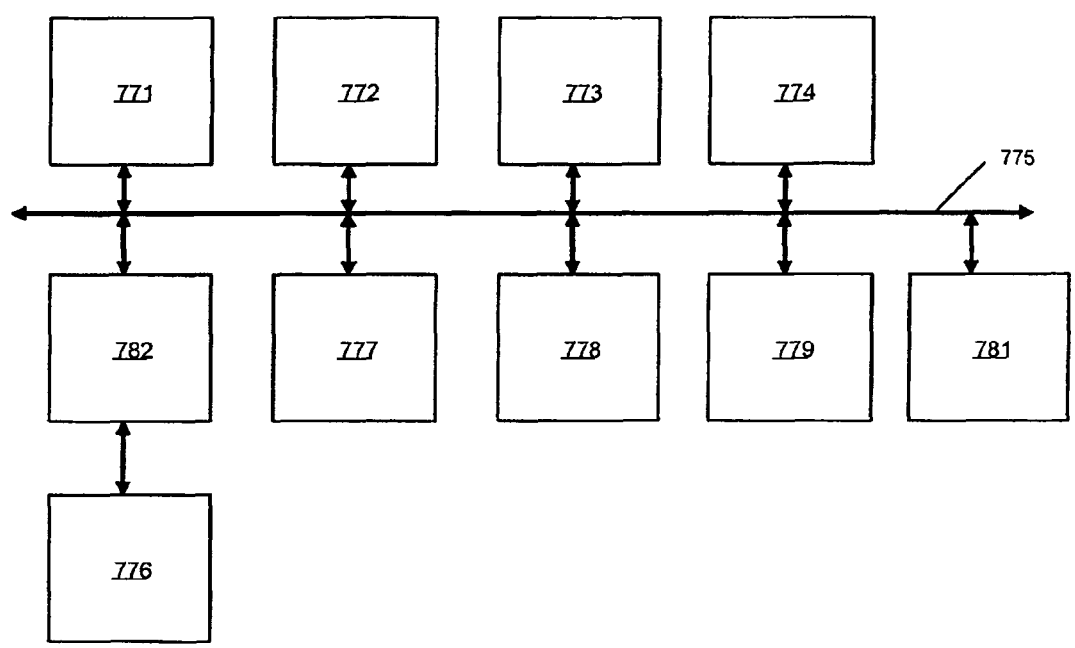
FIG. 10 shows a block diagram of a computer apparatus according to an embodiment of the invention.

The various participants and elements in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 10. The subsystems shown in FIG. 10 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

While illustrative embodiments of the invention have been shown herein, it will be apparent to those skilled in the art that the invention may be embodied still otherwise without departing from the spirit and scope of the claimed invention.

Any of the above described steps may be embodied as computer code on a computer readable medium. The computer readable medium may reside on one or more computational apparatuses and may use any suitable data storage technology.

Embodiments of the present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

Any of the software components or functions described in this application, may be implemented as software code to be executed by a processor using any suitable computer language such as, for example, Java, C++, or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an", or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for obfuscating an account identifier comprising:
   identifying, by a computing device, a first end portion of the account identifier;
   identifying, by the computing device, a middle portion of the account identifier, wherein the middle portion of the account identifier excludes the first end portion of the account identifier and further excludes a second end portion of the account identifier;
   identifying, by the computing device, the second end portion of the account identifier;
   creating, by the computing device, a unique derived key using at least a master key, the first end portion of the account identifier, and the second end portion of the account identifier;
   generating, by the computing device during a financial transaction, a dynamic cryptogram unique to the financial transaction using the created unique derived key;
   generating, by the computing device, an obfuscated portion of the account identifier using the generated dynamic cryptogram;
   replacing, by the computing device, the middle portion of the account identifier with the generated obfuscated portion to create an obfuscated account identifier; and
   transmitting, by the computing device to another device, the created obfuscated account identifier within an account identifier field of a transaction data for the financial transaction.

2. The method of claim 1, wherein the first end portion of the account identifier comprises a bank identification number and wherein the second end portion of the account identifier comprises five characters or less.

3. The method of claim 1 further comprising: changing, using the computing device, a check digit of the obfuscated account identifier from a first value to a second value, wherein the check digit is exclusive of the first end portion, the second end portion, and the obfuscated portion, and wherein the first value is stored in a verification field of the transaction data.

4. The method of claim 3, wherein the second value is selected so that a first checksum result of the obfuscated account identifier including the changed check digit matches a second checksum result of the account identifier.

5. The method of claim 1, wherein the dynamic cryptogram is further based upon a variable transaction counter value, and wherein the method further comprises changing the variable transaction counter value.

6. The method of claim 1, wherein said generating the obfuscated portion comprises:
   converting the middle portion to hexadecimal digits; and
   generating a raw value by performing an Exclusive-OR (XOR) operation on the hexadecimal digits and the dynamic cryptogram.

7. The method of claim 6, further comprising:
   determining that the raw value exceeds a first constant, setting, using the computing device, a flag value within a verification field of the transaction data; and
   subtracting, using the computing device, a second constant from the raw value to form the obfuscated portion.

8. The method of claim 1 wherein the another device comprises a host server computer.

9. The method of claim 8,
   determining that the server computer is unsuccessful in acquiring the account identifier from the obfuscated account identifier;
   based on the determination that the server computer is unsuccessful in acquiring the account identifier from the obfuscated account identifier, generating a alert.

10. A non-transitory computer readable medium having instructions embodied thereon that when executed by a processor causes the processor to obfuscate an account identifier by performing operations comprising:
    identifying a first end portion of the account identifier;
    identifying a middle portion of the account identifier, wherein the middle portion of the account identifier excludes the first end portion of the account identifier and further excludes a second end portion of the account identifier;
    identifying the second end portion of the account identifier;
    creating a unique derived key using at least a master key, the first end portion of the account identifier, and the second end portion of the account identifier;
    generating during a financial transaction a dynamic cryptogram unique to the financial transaction using the created unique derived key;
    generating an obfuscated portion of the account identifier using the generated dynamic cryptogram;
    replacing the middle portion of the account identifier with the generated obfuscated portion to create an obfuscated account identifier; and
    transmitting the created obfuscated account identifier within an account identifier field of a transaction data for the financial transaction.

11. A method for determining an account identifier from an obfuscated account identifier comprising:
    receiving, by the computing device for a financial transaction, a transaction data including the obfuscated account identifier;
    identifying, by the computing device, a first end portion of the obfuscated account identifier;
    identifying, by the computing device, an obfuscated middle portion of the obfuscated account identifier, wherein the obfuscated middle portion of the obfuscated account identifier excludes the first end portion of the obfuscated account identifier and further excludes a second end portion of the obfuscated account identifier;
    identifying, by the computing device, the second end portion of the obfuscated account identifier;
    creating, by the computing device, a unique derived key using at least a master key, the first end portion of the account identifier, and the second end portion of the account identifier;
    generating, by the computing device during the financial transaction, a dynamic cryptogram unique to the financial transaction based upon the created unique derived key;
    generating, by the computing device, a middle portion of the account identifier using the generated dynamic cryptogram; and
    replacing, by the computing device, the obfuscated middle portion of the obfuscated account identifier with the generated middle portion to form the account identifier.

12. The method of claim 11, wherein said identifying the obfuscated middle portion comprises determining, by the computing device, which digits of a plurality of digits of the obfuscated account identifier comprise the obfuscated portion of the obfuscated account identifier.

13. The method of claim 11, wherein the dynamic cryptogram is further based upon a variable transaction counter value and wherein the method further comprises changing, by the computing device, the variable transaction counter value.

14. The method of claim 11, wherein said generating the middle portion of the account identifier comprises:
    converting, by the computing device, the obfuscated middle portion to hexadecimal digits; and
    generating, by the computing device, a raw value by performing an Exclusive-OR (XOR) operation using at least some of the generated dynamic cryptogram and the converted obfuscated middle portion.

15. The method of claim 14, further comprising:
    determining, by the computing device, that a flag is set in a verification field of the transaction data; and
    determining that the flag is set, adding, by the computing device, a fixed value to the raw value to form the middle portion.

16. The method of claim 14, further comprising:
    identifying, by the computing device, a stored check digit from a verification field of the transaction data; and
    combining, by the computing device, the raw value with the stored check digit.

17. The method of claim 11, further comprising:
    determining that the formed account identifier is invalid, generating, by the computing device, a alert.

18. A non-transitory computer readable medium having instructions embodied thereon that when executed by a processor of a computing device causes the processor to determine an account identifier from an obfuscated account identifier by performing operations comprising:
    receiving a transaction data including the obfuscated account identifier for a financial transaction;
    identifying a first end portion of the obfuscated account identifier;
    identifying an obfuscated middle portion of the obfuscated account identifier, wherein the obfuscated middle portion of the obfuscated account identifier excludes the first end portion of the
    obfuscated account identifier and further excludes a second end portion of the obfuscated account identifier;
    identifying the second end portion of the obfuscated account identifier;
    creating a unique derived key using at least a master key, the first end portion of the account identifier, and the second end portion of the account identifier;
    generating during the financial transaction a dynamic cryptogram unique to the financial transaction based upon the created unique derived key;
    generating a middle portion of the account identifier using the generated dynamic cryptogram; and
    replacing the obfuscated middle portion of the obfuscated account identifier with the generated middle portion to form the account identifier.

19. The method of claim 1, wherein the computing device is a portable consumer device associated with a payment account associated with the account identifier.

20. The method of claim 1, wherein the computing device is an access device at a merchant.

21. The method of claim 8, wherein the transaction data is communicated in an authorization request message to the host server computer for authorizing the financial transaction.

* * * * *

UNITED STATES PATENT AND TRADEMARK OFFICE
CERTIFICATE OF CORRECTION

PATENT NO. : 9,065,643 B2  
APPLICATION NO. : 12/146150  
DATED : June 23, 2015  
INVENTOR(S) : Simon Hurry et al.

It is certified that error appears in the above-identified patent and that said Letters Patent is hereby corrected as shown below:

Claims

In Claim 7 in Column 16, line 61 please replace "determining that the raw value exceeds a first constant," with --determining that the raw value exceeds a first constant;--

In Claim 9 in Column 17, line 1 please replace "The method of claim 8," with --The method of claim 8, further comprising:--

In Claim 11 in Column 17, lines 49-51 please replace "the first end portion of the account identifier, and the second end portion of the account identifier;" with --the first end portion of the obfuscated account identifier, and the second end portion of the obfuscated account identifier;--

In Claim 14 in Column 18, lines 12-14 please replace "using at least some of the generated dynamic cryptogram and the converted obfuscated middle portion." with --using at least some of the generated dynamic cryptogram and the obfuscated middle portion.--

In Claim 15 in Column 18, lines 18-19 please replace "determining that the flag is set, adding, by the computing device," with --adding, by the computing device,--

In Claim 17 in Column 18, line 27 please replace "determining that the formed account identifier is invalid," with --determining that the formed account identifier is invalid; and--

In Claim 18 in Column 18, lines 47-48 please replace "the first end portion of the account identifier, and the second end portion of the account identifier;" with --the first end portion of the obfuscated account identifier, and the second end portion of the obfuscated account identifier;--

Signed and Sealed this  
Ninth Day of February, 2016

Michelle K. Lee  
*Director of the United States Patent and Trademark Office*